(12) United States Patent
Morsell et al.

(10) Patent No.: US 9,888,698 B1
(45) Date of Patent: Feb. 13, 2018

(54) MULTIFUNCTIONAL SHELL-OPENING UTENSIL

(71) Applicants: Cassandra Morsell, Fredericksburg, VA (US); Paul Jarelle White, Fredericksburg, VA (US)

(72) Inventors: Cassandra Morsell, Fredericksburg, VA (US); Paul Jarelle White, Fredericksburg, VA (US)

( * ) Notice: Subject to any disclaimer, the term of this patent is extended or adjusted under 35 U.S.C. 154(b) by 0 days.

(21) Appl. No.: 15/455,152

(22) Filed: Mar. 10, 2017

(51) Int. Cl.
    *A22C 29/00*    (2006.01)
    *A22C 29/02*    (2006.01)
    *A47G 21/06*    (2006.01)
    *A22C 29/04*    (2006.01)

(52) U.S. Cl.
    CPC .......... *A22C 29/027* (2013.01); *A22C 29/046* (2013.01); *A47G 21/06* (2013.01)

(58) Field of Classification Search
    CPC ....... A22C 29/00; A22C 29/02; A22C 29/021; A22C 29/022; A22C 29/024; A22C 29/027; A22C 29/043; A22C 29/046
    USPC ............... 452/1–6, 12, 13, 16, 17, 102–105; 30/120.1–120.5, 137, 147, 148
    See application file for complete search history.

(56) References Cited

U.S. PATENT DOCUMENTS

| | | | | |
|---|---|---|---|---|
| 509,103 A * | 11/1893 | Schrader | ............... | A47G 21/023 30/137 |
| 656,092 A * | 8/1900 | Cables | ................... | B26B 11/00 30/143 |
| 674,961 A * | 5/1901 | Craig | ..................... | A47G 21/08 30/148 |
| 923,709 A * | 6/1909 | Russler | ................ | A47G 21/023 30/137 |
| 1,028,961 A * | 6/1912 | Porter | ................... | A47G 21/08 30/148 |
| 2,539,849 A * | 1/1951 | Lum | .................... | A47G 21/023 294/61 |
| 4,200,961 A * | 5/1980 | Mueller | ............... | A22C 29/024 30/120.1 |
| 4,551,886 A * | 11/1985 | Couche | ................ | A47G 21/065 452/17 |
| 4,553,287 A * | 11/1985 | DeSordi | ............... | A22C 29/024 452/3 |
| 4,759,126 A * | 7/1988 | McCoy | ................ | A22C 29/024 30/120.1 |
| 5,542,181 A * | 8/1996 | Gaylord | ................. | A47G 21/02 30/148 |
| 5,613,904 A * | 3/1997 | LaSalle | ............... | A22C 29/024 30/120.1 |
| 6,390,911 B1 * | 5/2002 | Lombardo | ........... | A22C 29/024 30/137 |
| 6,450,871 B1 * | 9/2002 | Morrison, Jr. | ....... | A22C 25/006 452/1 |
| 6,536,114 B2 * | 3/2003 | Lawless | .................. | A47J 43/28 30/120.1 |
| 6,817,937 B1 * | 11/2004 | Merritt | ................. | A47G 21/061 452/103 |
| 7,024,777 B1 * | 4/2006 | Bach | .................... | A47G 21/061 30/120.1 |

(Continued)

*Primary Examiner* — Richard Price, Jr.

(57) ABSTRACT

A utensil to open a shell of a shellfish, including a first end including a shell breaking tool, a second end including a fork, and a handle to connect the first end to the second end, such that at least a portion of a bottom surface of the handle includes a sharpened edge.

12 Claims, 5 Drawing Sheets

(56) References Cited

U.S. PATENT DOCUMENTS

| | | | | |
|---|---|---|---|---|
| 7,578,731 B1* | 8/2009 | Moore | ................. | A22B 5/0047 |
| | | | | 452/103 |
| 8,662,966 B2* | 3/2014 | Rizzo | ................... | A22C 29/027 |
| | | | | 452/6 |
| 2012/0190282 A1* | 7/2012 | Rizzo | ................... | A22C 29/027 |
| | | | | 452/6 |

* cited by examiner

MULTIFUNCTIONAL SHELL-OPENING UTENSIL

BACKGROUND OF THE INVENTION

1. Field of the Invention

The present general inventive concept relates to a shell-opening utensil for facilitating the opening and removal of meat from crab bodies, crab legs, and other types of shellfish, and particularly to a shell-opening utensil to sever a shell of a shellfish, extract meat out of an opened shellfish if the meat has not been fully exposed by the severing operation, and to break open areas of the shell which are normally difficult to crack and open, in order to expose the meat for extraction.

2. Description of the Related Art

Crustaceans (e.g., shellfish) such as crabs and lobsters are often prepared for eating by cooking and serving the shellfish while still in a shell. The shell must be removed or broken away from the meat before the meat can be consumed. Boiling or broiling of a shellfish such as a crab, for example, typically does not change characteristics of the shell to an extent that it can be easily broken to access the meat of the crab.

Conventional shell-opening utensils include bifurcated, pivoted handle, nutcracker-type utensils, which have been used to crack the shells of crab legs or other types of shellfish in order to facilitate manual removal of the shellfish meat from the protective shell. However, the nutcracker-type utensils are only useful for opening crab and lobster legs, and do not allow a user to open a body of a crab or a tail of a lobster. Also, the nutcracker-type utensils are relatively expensive, and therefore result in a relatively large cost for restaurants when these nutcracker-type utensils are stolen by customers. Furthermore, the nutcracker-type utensils do not allow the user to easily extract the meat from the shell after it is open. Moreover, the nutcracker-type utensils are not particularly useful in when shells that are somewhat soft, and mere cracking of the shell often does not allow the user to then easily remove meat from the cracked shell, such as with shrimp and prawn. Finally, the nutcracker-type utensils do not provide a mechanism for removing hard-to-access meat, and the user typically needs to use a fork for meat extraction.

Other conventional shell-opening utensils include a combination utensil, such as the invention described in U.S. Pat. No. 7,134,206, include a combination of a crustacean shell breaking tool at one end, and a fork at another end. However, the combination utensil is also limited only to allowing a user to open claws and tails of crustaceans, and do not allow the user to sever a body of a crab. Moreover, the combination utensil has design flaws, as it is difficult to maintain a good grip of the combination utensil as it is used to sever a crab claw, for example.

Further conventional shell-opening utensils include oyster, clam, and mussel openers, also known as "shuckers." However, shuckers are typically only used to open raw oysters and clams, and are not readily offered to customers to use in a restaurant when they order jambalaya, Cajun seafood boils, or other dishes that serve multiple types of seafood including cooked clams, mussels, and oysters. Also, shuckers are typically made of metal, and are therefore expensive to produce and purchase.

Therefore, there is a need for a single multifunctional shell-opening utensil that allows a user to open multiple types of shellfish in multiple ways, and then extract meat from the opened shellfish.

SUMMARY

The present general inventive concept provides multifunctional shell-opening utensil to allow a user to open various types of shellfish to easily extract meat therefrom.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a utensil to open a shell of a shellfish, including a first end comprising a shell breaking tool, a second end comprising a fork, and a handle to connect the first end to the second end, such that at least a portion of a bottom surface of the handle comprises a sharpened edge.

The shell breaking tool may include a first member extending longitudinally away from the handle, a second member disposed adjacent to the first member and extending longitudinally away from the handle, such that a gap is defined between at least a portion of the first member and the second member.

The first member may be longer than the second member, such that an end of the first member comprises a sharpened edge.

At least a portion of the end of the first member may be inclined.

The utensil may further include a first projecting portion disposed on at least a portion of the bottom surface near the first end, and a second projecting portion disposed on at least a portion of a top surface of the handle near the first end.

The second projecting portion may be disposed further from the second end than the first projecting portion.

The first projecting portion may include a concave portion facing the first end, and the second projecting portion comprises a concave portion facing the second end.

The utensil may further include a first projecting portion disposed on at least a portion of the bottom surface near the first end, and a second projecting portion disposed on at least a portion of a top surface of the handle near the first end.

The second projecting portion may be disposed further from the second end than the first projecting portion.

The first projecting portion may include a concave portion facing the first end, and the second projecting portion may include a concave portion facing the second end.

The foregoing and/or other features and utilities of the present general inventive concept may also be achieved by providing a utensil to open a shell of a shellfish, including a first end, including a first member extending from the handle, the first member including a wedged tip, and a second member extending from the handle and disposed adjacent to the first member, such that at least a portion of the second member contacts the first member, a second end including a fork, and a handle to connect the first end to the second end, such that at least a portion of a bottom surface of the handle includes a sharpened edge.

The fork may include at least two tines.

At least a portion of the second member may be separated from the first member.

The second member may include an inner surface comprising a tapered edge, and a pointed tip.

The utensil may further include a first projecting portion disposed on at least a portion of the bottom surface near the first end, and a second projecting portion disposed on at least a portion of a top surface of the handle near the first end.

The second projecting portion may be disposed further from the second end than the first projecting portion.

The first projecting portion may include a concave portion facing the first end, and the second projecting portion may include a concave portion facing the second end.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figures 1A, 1B:
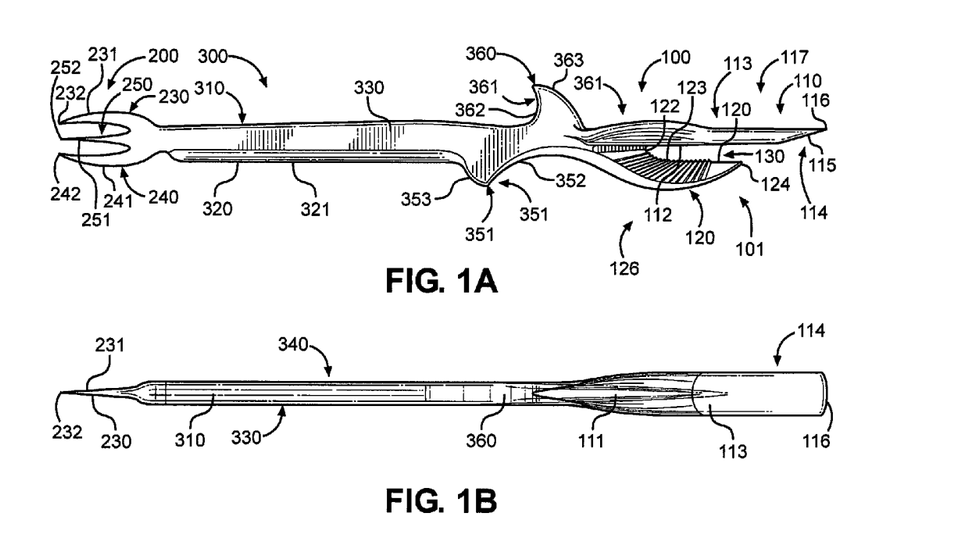
FIG. 1A illustrates a side view of a multifunctional shell-opening utensil, according to an exemplary embodiment of the present general inventive concept.
FIG. 1B illustrates a top view of the multifunctional shell-opening utensil of FIG. 1A, according to an exemplary embodiment of the present general inventive concept.
Figure 1C:
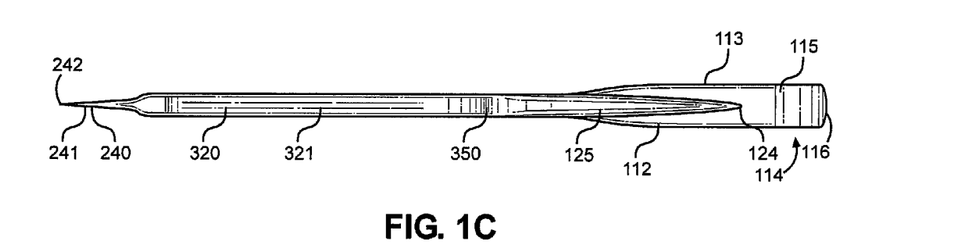
FIG. 1C illustrates a bottom view of the multifunctional shell-opening utensil of FIG. 1A, according to an exemplary embodiment of the present general inventive concept.
Figure 1D:
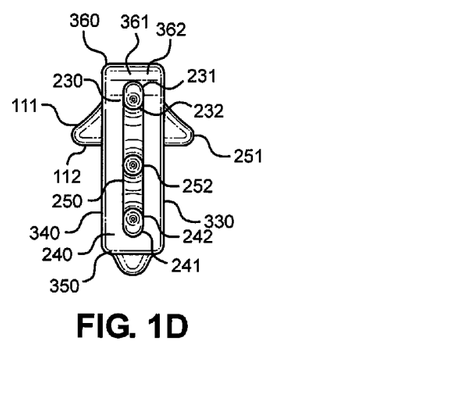
FIG. 1D illustrates a front view of the multifunctional shell-opening utensil of FIG. 1A, according to an exemplary embodiment of the present general inventive concept.
Figure 1E:
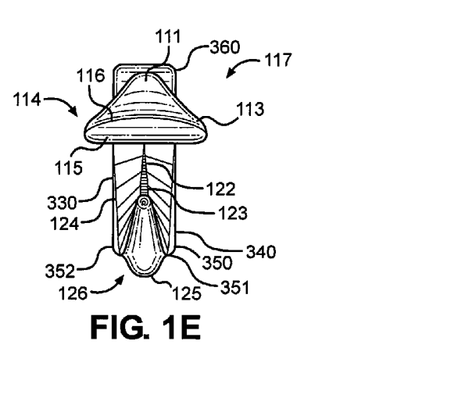
FIG. 1E illustrates a rear view of the multifunctional shell-opening utensil of FIG. 1A, according to an exemplary embodiment of the present general inventive concept.

FIG. 1A illustrates a side view of a multifunctional shell-opening utensil 1, according to an exemplary embodiment of the present general inventive concept.

Referring to FIG. 1A, the multifunctional shell-opening utensil 1 may include a first end 100, a second end 200 that is opposite the first end 100, and a handle 300 separating the first end 100 and the second end 200.

The first end 100 may be formed in a shape of a shell-breaking tool 101 including a first member 110 extending longitudinally away from the handle 300, and a second member 120 disposed adjacent to the first member 110 and extending longitudinally away from the handle 300, such that a gap 130 is defined between at least a portion of the first member 110 and the second member 120.

Referring to FIG. 1A, the multifunctional shell-opening utensil 1 may be formed of a single piece of plastic, metal, ceramic, or any other type of durable composition, but is not limited thereto. Alternatively, the multifunctional shell-opening utensil 1 may include various pieces attached and fixed together using glue, welding, etc.

The first end 100 may include a shell breaking tool 101, to allow a user to break open a claw shell of a crab or a lobster, for example.

The shell breaking tool 101 may include a first member 110, a second member 120, and a slot 130 disposed between the first member 110 and the second member 120. The slot 130 may be a gap between the first member 110 and the second member 120, and may have a predetermined and/or varying size based on a user's preference.

The first member 110 may extend laterally (i.e., longitudinally) from the first end 100.

The first member 110 may include an outer surface 111, an inner surface 112, an extended portion 113, and a wedge portion 114.

The outer surface 111 may be rectangular, rounded, flat, trapezoidal, or have any other shape to maximize its strength.

The inner surface 112 is disposed opposite the outer surface, and may have a shape similar to or different from the outer surface 111, in order to maximize its strength.

The extended portion 113 may be connected to the first member 110 to extend laterally (i.e., longitudinally) from the first end 100. The extended portion 113 may be extended from the first end 100 at various distances, and therefore is not limited to a length as illustrated in FIG. 1A.

The extended portion 113 may include a wedge portion 114 at an end thereof.

The wedge portion 114 may include an inclined surface 115 and a chisel tip 116. Although FIG. 1A illustrates the inclined surface 115 beginning from the inner surface 112 and extending upward toward the outer surface 111 to the chisel tip 116, alternatively, the inclined surface may begin from the outer surface 111 to extend downward toward the inner surface 112 to the chisel tip 116.

The extended portion 113, the wedge portion 114, the inclined surface 115, and the chisel tip 116 may all be included in the present general inventive concept as a shucking tool 117, in order to allow the user to shuck an oyster shell, clam shell, or mussel shell. More specifically, the chisel tip 116 may be a sharpened edge to allow the user to wedge the shucking tool 117 into a mussel shell, for example, while the inclined surface 115 pries the mussel shell open until at least a portion of the extended portion 113 is inside the semi-opened mussel shell. Then, the user may rotate (i.e., twist) the handle 300 in order to cause the extended portion 113 to pry open the mussel shell substantially to allow meat inside the mussel shell to be accessed.

The second member 120 may include an inner edge 121, a splitting edge 122, a serrated portion 123, a point tip 124, and an outer edge 125.

The inner edge 121 (a.k.a., inner surface) may be tapered in order to form a sharp edge, or may alternatively include the serrated portion 123 to facilitate in cutting open a claw shell, for example. The splitting edge 122 is located near the first member 110, and may also be sharpened (i.e., tapered) in order to facilitate in splitting open the claw shell. The point tip 125 may also be used to puncture the claw shell in order to aid in the weakening and severing of the claw shell. The second member 120 may also be known as a claw shell breaking tool 126.

The outer edge 125 may be rectangular, rounded, flat, trapezoidal, or have any other shape to maximize its strength, so that the claw shell may be successfully severed while maintaining the integrity of the second member 120.

When the user desires to split open the claw shell, for example, the second member 120 may first be inserted into an end of the claw shell as much as the slot 130 permits, until the splitting edge 122 contacts the claw shell. Then, the user may apply an upward force to simultaneously puncture the claw shell with the point tip 124, while also applying a forward motion in a lateral direction of the claw shell to utilize the splitting edge 122 to sever the claw shell along its lateral axis. As the claw shell continues to be split, the user continues to apply the upward and forward motions to fully split the claw shell, until meat inside the claw shell is easily accessible.

Accordingly, the first end 100 of the present general inventive concept may include both the shucking tool 117 and the claw shell breaking tool 126, but is not limited thereto.

Referring to FIG. 1A, the second end 200 may include a fork 210.

The fork 210 may include a body 220, a first tine 230, a second tine 240, and a center tine 250. The center tine 250 may be disposed between the first tine 230 and the second tine 240, such that the first tine 230, the second tine 240, and the center tine 250 are all disposed on a same plane.

The first tine 230 may include a body portion 231 and a tip 232.

The body portion 231 may have a plurality of shapes, including straight, concave, and convex, depending on a user's preference.

The tip 232 may be pointed (i.e., relatively sharp) in order to allow the user to puncture meat out of a shell of a shellfish. The tip 232 may have a variety of different shapes, including straight, hooked inward toward the center tine 250, hooked outward away from the center tine 250, hooked upward, or hooked downward.

The second tine 240 may include a body portion 241 and a tip 242.

The body portion 241 may have a plurality of shapes, including straight, concave, and convex, depending on a user's preference.

The tip 242 may be pointed (i.e., relatively sharp) in order to allow the user to puncture meat out of a shell of a shellfish. The tip 242 may have a variety of different shapes, including straight, hooked inward toward the center tine 250, hooked outward away from the center tine 250, hooked upward, or hooked downward.

Although FIG. 1A illustrates the center tine 250 as part of the fork 210, the center tine 250 may be optional, and a manufacturer may choose to omit the center tine 250 to allow the fork 210 to be more compact. Otherwise, the center tine 250 may include a body portion 251 and a tip 252.

As illustrated in FIG. 1A, the fork 210 may be disposed at the second end 200, such that a plane upon which the first tine 230, the second tine 240, and the center tine 250 are disposed is parallel to (i.e., in-line with) a first side surface 330 and a second side surface 340 of the handle 300. Alternatively, the fork 210 may be disposed at the second end 200, such that a plane upon which the first tine 230, the second tine 240, and the center tine 250 are disposed is perpendicular to the first side surface 330 and the second side surface 340 of the handle 300.

The fork 210 may be utilized by the user to extract any meat from any shell that has been opened by other portions of the multifunctional shell-opening utensil 1.

Referring to FIG. 1A, the handle 300 may include a top edge 310, a bottom edge 320, the first side surface 330, the second side surface 340, a first projecting portion 350, and a second projecting portion 360. The first projecting portion 350 and the second projecting portion 360 may also be called "finger grips," "finger rests," "shark fins," and "protruding portions."

The top edge 310 may be rectangular, rounded, flat, trapezoidal, or have any other shape to maximize its strength.

The bottom edge 320 is disposed opposite with respect to the top edge 310, and may be tapered (i.e., sharpened) with a tapered portion 321, in order to form a "knife-like" edge. Alternatively, the bottom edge 320 may have a variety of shapes that imitate an edge of a knife, based on the user's preference.

The first side surface 330 is disposed opposite with respect to the second side surface 340, and both the first side surface 330 and the second side surface are disposed between the top edge 310 and the bottom edge 320.

The bottom edge 320 may be used as a body bisecting tool to bisect a crab body, for example.

The first projecting portion 350 may be disposed on at least a portion of the bottom edge 320 of the handle 300, preferably at a location near the first end 100, and may include a gripping portion 351 and a back portion 353.

The gripping portion 351 (a.k.a., concave portion 351) may be provided as a concave grip for a forefinger of a user to be used when the user is using the claw shell breaking tool 126 to open the claw shell. The gripping portion 351 may face the first end 100. The gripping portion 351 may include a roughened portion 352 in order to provide a non-slick surface for the user's forefinger. Specifically, the roughened portion 352 may include a ribs, protruding dots, or any other type of surface that allows the forefinger of the user to have superior traction on the gripping portion 351.

The back portion 353 may be convex, as illustrated in FIG. 1A. Alternatively, the back portion 353 may be concave, similar to the gripping portion 351, in order to provide alternative gripping options for the user.

The second projecting portion 360 may be disposed on at least a portion of the top surface 310 of the handle 300, preferably at a location near the first end 100, but further from the second end 200 than the first projecting portion 350. As such, a relative distance between the first projecting portion 350 and the second projecting portion 360, and with respect to the second end 200, allows the user to have a superior grip on the multifunctional shell-opening utensil 1. However, the roughened portion 352 is optional, and the gripping portion 351 may be smooth.

The second projecting portion 360 may include a gripping portion 361 and a back portion 363.

The gripping portion 361 (a.k.a., concave portion 361) may be provided as a concave grip for a thumb of a user to be used when the user is using the claw shell breaking tool 126 to open the claw shell. The gripping portion 361 may face the second end 200. The gripping portion 361 may include a roughened portion 362 in order to provide a non-slick surface for the user's forefinger. Specifically, the roughened portion 362 may include a ribs, protruding dots, or any other type of surface that allows the thumb of the user to have superior traction on the gripping portion 361. However, the roughened portion 362 is optional, and the gripping portion 361 may be smooth.

The back portion 363 may be convex, as illustrated in FIG. 1A. Alternatively, the back portion 363 may be concave, similar to the gripping portion 361, in order to provide alternative gripping options for the user.

The first projecting portion 350 and the second projecting portion 360 may be optional, and may be provided as part of the handle 300 in order to facilitate the user's grip when utilizing the multifunctional shell opening utensil 1.

FIGS. 2A through 2F illustrate perspective views of various formations of a second end 200 of the multifunctional shell-opening utensil 1 of FIG. 1A, according to exemplary embodiments of the present general inventive concept.

Figure 2A:
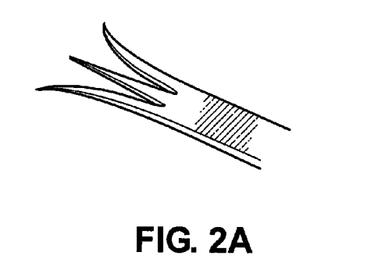
FIGS. 2A through 2F illustrate perspective views of various formations of a second end of the multifunctional shell-opening utensil of FIG. 1A, according to exemplary embodiments of the present general inventive concept.

Referring to FIG. 2A, a second end 200a may include a fork 210a.

The fork 210a may include a body 220a, a first tine 230a, a second tine 240a, and a center tine 250a. The center tine 250a may be disposed between the first tine 230a and the second tine 240a, such that the first tine 230a, the second tine 240a, and the center tine 250a are all disposed on a same plane.

The first tine 230a may include a body portion 231a and a tip 232a.

The second tine 240a may include a body portion 241a and a tip 242a.

The center tine 250a may include a body portion 251a and a tip 252a.

As illustrated in FIG. 2A, the body portion 231a and the body portion 241a may flair outwards away from the body portion 251a, respectively, such that the tips 232a and 242a are further from the tip 252a than the body portions 231a and 241a are from the body portion 251a.

In FIG. 2A, the fork 210a may be flat when viewed from a side perspective, but is not limited thereto.

Furthermore, the center tine 250a may be optional, and to conserve space, may therefore be omitted.

Figure 2B:
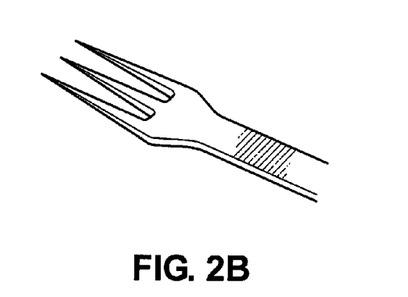

Referring to FIG. 2B, a second end 200b may include a fork 210b.

The fork 210b may include a body 220b, a first tine 230b, a second tine 240b, and a center tine 250b. The center tine 250b may be disposed between the first tine 230b and the second tine 240b, such that the first tine 230b, the second tine 240b, and the center tine 250b are all disposed on a same plane.

The first tine 230b may include a body portion 231b and a tip 232b.

The second tine 240b may include a body portion 241b and a tip 242b.

The center tine 250b may include a body portion 251b and a tip 252b.

As illustrated in FIG. 2B, the first tine 230b, the second tine 240b, and the center tine 250b may all be parallel to each other.

In FIG. 2B, the fork 210b may be flat when viewed from a side perspective, but is not limited thereto.

Figure 2C:
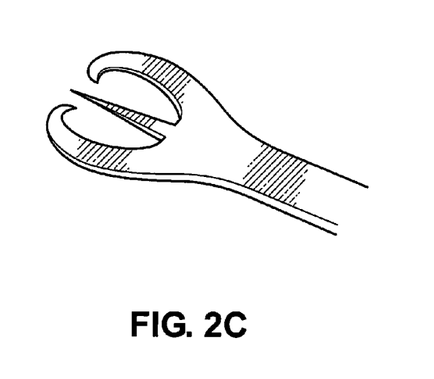

Referring to FIG. 2C, a second end 200c may include a fork 210c.

The fork 210c may include a body 220c, a first tine 230c, a second tine 240c, and a center tine 250c. The center tine 250c may be disposed between the first tine 230c and the second tine 240c, such that the first tine 230c, the second tine 240c, and the center tine 250c are all disposed on a same plane.

The first tine 230c may include a body portion 231c and a tip 232c.

The second tine 240c may include a body portion 241c and a tip 242c.

The center tine 250c may include a body portion 251c and a tip 252c.

As illustrated in FIG. 2C, the body portion 231c and the body portion 241c may first flair outwards away from the body portion 251c, and then back inwards toward the body portion 251c, respectively, such that the tips 232c and 242c are closer from the tip 252c than at least portions of the body portions 231c and 241c are from the body portion 251c. More specifically, the tips 232c and 242c may "hook" inwards, to allow the user to "hook" onto meat inside a shell for easy extraction.

In FIG. 2C, the fork 210c may be flat when viewed from a side perspective, but is not limited thereto.

Figure 2D:
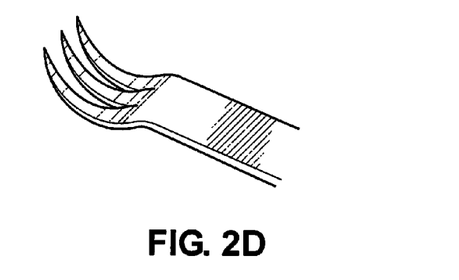

Referring to FIG. 2D, a second end 200d may include a fork 210d.

The fork 210d may include a body 220d, a first tine 230d, a second tine 240d, and a center tine 250d. The center tine 250d may be disposed between the first tine 230d and the second tine 240d, such that the first tine 230d, the second tine 240d, and the center tine 250d are all disposed on a same plane.

The first tine 230d may include a body portion 231d and a tip 232d.

The second tine 240d may include a body portion 241d and a tip 242d.

The center tine 250d may include a body portion 251d and a tip 252d.

As illustrated in FIG. 2D, the body portion 231d, the body portion 241d, and the body portion 251d may all be in-line and have a concave curvature, similar to a spoon, for more comfortable meat extraction.

Figure 2E:
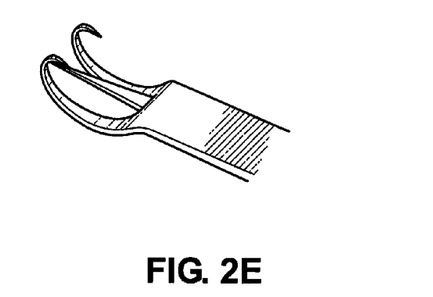

Referring to FIG. 2E, a second end 200e may include a fork 210e.

The fork 210e may include a body 220e, a first tine 230e, a second tine 240e, and a center tine 250e. The center tine 250e may be disposed between the first tine 230e and the second tine 240e, such that the first tine 230e, the second tine 240e, and the center tine 250e are all disposed on a same plane.

The first tine 230e may include a body portion 231e and a tip 232e.

The second tine 240e may include a body portion 241e and a tip 242e.

The center tine 250e may include a body portion 251e and a tip 252e.

As illustrated in FIG. 2E, the body portion 231e, the body portion 241e, and the body portion 251e may all be in-line and have a convex curvature, similar to an upside-down spoon, for more comfortable meat extraction.

Figure 2F:
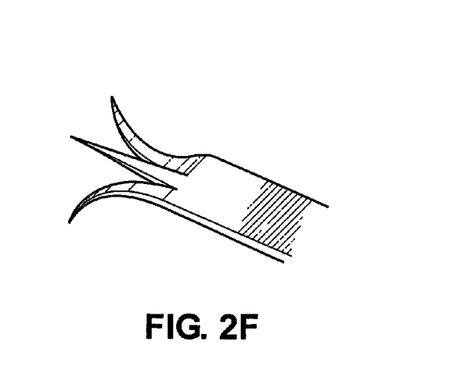

Referring to FIG. 2F, a second end 200f may include a fork 210f.

The fork 210f may include a body 220f, a first tine 230f, a second tine 240f, and a center tine 250f. The center tine 250f may be disposed between the first tine 230f and the second tine 240f, such that the first tine 230f, the second tine 240f, and the center tine 250f are all disposed on a same plane.

The first tine 230f may include a body portion 231f and a tip 232f.

The second tine 240f may include a body portion 241f and a tip 242f.

The center tine 250f may include a body portion 251f and a tip 252f.

As illustrated in FIG. 2F, the body portion 231f may have a concave curvature, the body portion 241f may have a convex curvature, and the body portion 251f may be straight, for more efficient meat extraction.

Referring to the various exemplary embodiments as illustrated in FIGS. 2A through 2F, it is possible that various embodiments to be mixed and/or combined. For example, the fork 200a illustrated in FIG. 2A may be combined with the fork 200d illustrated in FIG. 2D, such that the fork 210a may be curved when viewed from a side-perspective in the same way as the fork 210d.

Figure 3A:
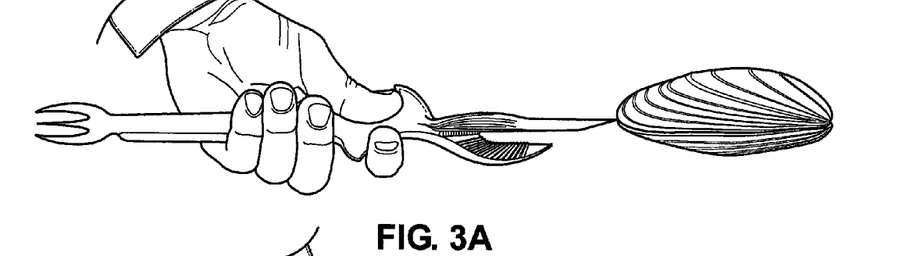
FIG. 3A through 3C illustrate the multifunctional shell-opening utensil of FIG. 1A utilized to open a mussel, according to an exemplary embodiment of the present general inventive concept.
Figure 3B:
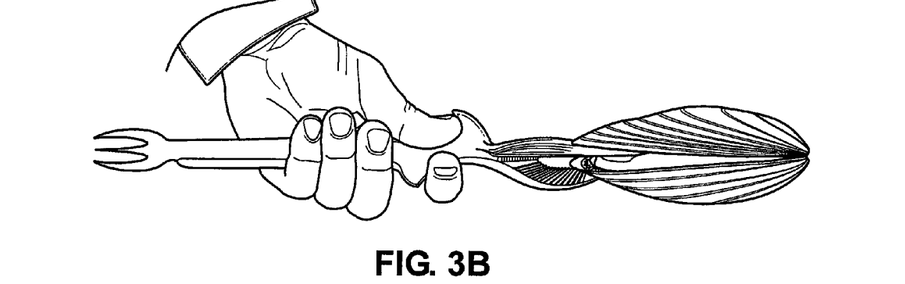
Figure 3C:
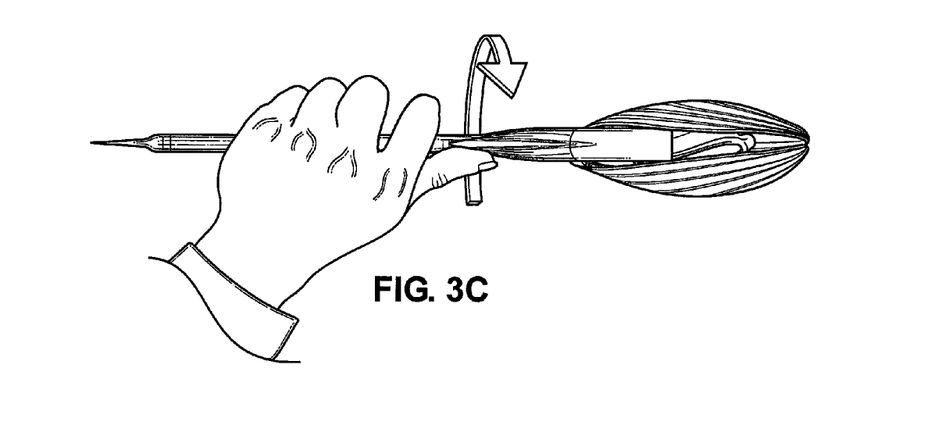

FIGS. 3A through 3C illustrate the multifunctional shell-opening utensil 1 of FIG. 1A utilized to open a mussel, according to an exemplary embodiment of the present general inventive concept. More specifically, FIGS. 3A through 3C illustrate a user using the multifunctional shell-opening utensil 1 of FIG. 1A to shuck the mussel.

FIG. 3A illustrates a hand of the user gripping the handle 300, and touching the chisel tip 116 to a lip of the mussel. More specifically, the user may hold a portion of the handle 300 in a palm of a hand of the user, place a forefinger around the gripping portion 351 of the first projecting portion 350, and place a tip of a thumb at a gripping portion 361 of the second projecting portion 360.

FIG. 3B illustrates the hand of the user moving forward to push the wedge portion 114 and a portion of the extended portion 113 into the lip of the mussel. As illustrated in FIG. 3B, the inclined surface 115 of the wedge portion 114 helps pry open the shell of the mussel.

In FIG. 3C, the hand of the user twists in order to cause the multifunctional shell-opening utensil 1 to twist. As a result, the extended portion 113 twists inside the shell of the mussel, and causes the mussel shell to crack open so that meat inside the mussel can be extracted.

Figures 4A, 4B, 4C:
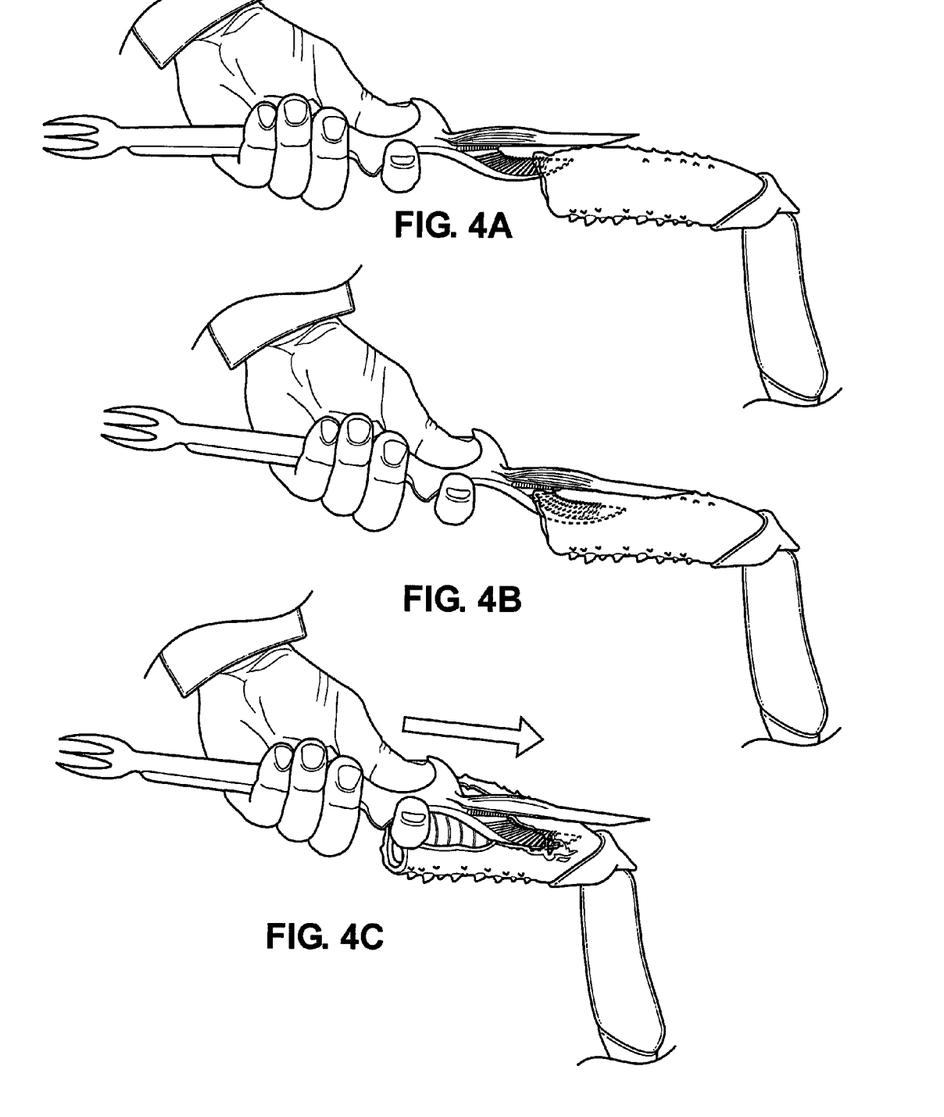
FIG. 4A through 4C illustrate the multifunctional shell-opening utensil of FIG. 1A utilized to open a claw shell, according to an exemplary embodiment of the present general inventive concept.

FIGS. 4A through 4C illustrate the multifunctional shell-opening utensil 1 of FIG. 1A utilized to open a claw shell, according to an exemplary embodiment of the present general inventive concept.

FIG. 4A illustrates the user inserts the second member 120 into an end of the claw shell as much as the slot 130 permits, until the splitting edge 122 contacts the claw shell. Then, the user applies an upward force to simultaneously puncture the claw shell with the point tip 124, while also applying a forward motion in a lateral direction of the claw shell to utilize the splitting edge 122 to sever the claw shell along its lateral axis.

FIG. 4B illustrates the user continuing to apply a forward and upward motion to continue to sever the top of the claw with the multifunctional shell-opening utensil 1.

FIG. 4C illustrates the top of the claw shell being fully severed, thereby making the meat inside the claw shell accessible.

Figure 5A:
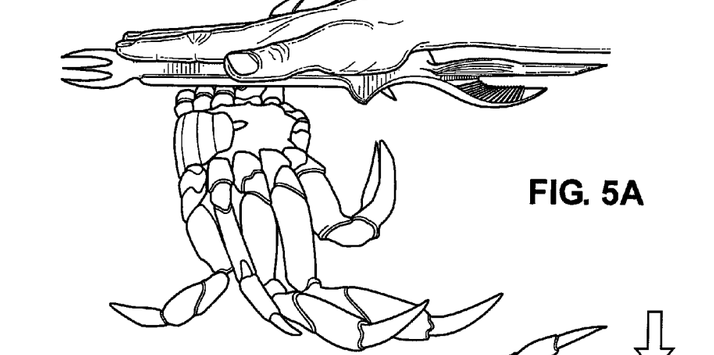
FIG. 5A through 5C illustrate the multifunctional shell-opening utensil of FIG. 1A utilized to bisect a crab body, according to an exemplary embodiment of the present general inventive concept.
Figures 5B, 5C:
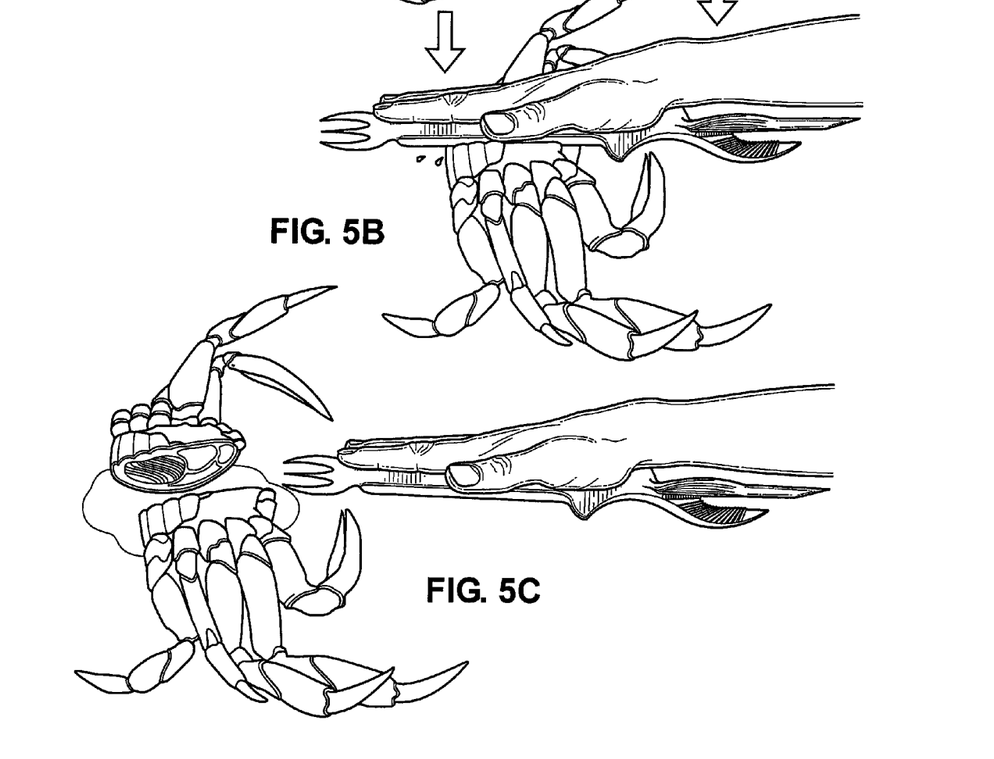

FIGS. 5A through 5C illustrate the multifunctional shell-opening utensil of FIG. 1A utilized to bisect a crab body, according to an exemplary embodiment of the present general inventive concept. More specifically, FIGS. 5A through 5C illustrate a user using the multifunctional shell-opening utensil 1 of FIG. 1A to cross-sectionally cut the crab body in half, in order to gain easy access to meat inside the crab body.

FIG. 5A illustrates a hand of the user gripping the handle 300, and the crab body being placed in a position to be bisected.

FIG. 5B illustrates the hand of the user moving downward to allow the bottom edge 320 of the handle 300 to touch a top of the crab body.

In FIG. 5C, the hand of the user continues to move downward to cut through and fully bisect the crab body in order to separate two halves of the crab body, so that the meat inside can easily be extracted by the user. The user may use the fork 210 to extract the meat from the two halves of the crab body.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As such, any combinations of the above embodiments are possible.

What is claimed is:
1. A utensil to open a shell of a shellfish, comprising:
a first end comprising a shell breaking tool, the shell breaking tool comprising:
a first member extending longitudinally away from the handle such that a portion of an end of the first member is inclined into a wedge,
a second member disposed adjacent to the first member and extending longitudinally away from handle, such that a gap is defined between at least a portion of the first member and the second member, and such that the first member is longer than the second member;
a second end comprising a fork; and
a handle to connect the first end to the second end.

2. The utensil of claim 1, further comprising:
a first projecting portion disposed on at least a portion of the bottom surface near the first end; and
　a second projecting portion disposed on at least a portion of a top surface of the handle near the first end.

3. The utensil of claim 2, wherein the second projecting portion is disposed further from the second end than the first projecting portion.

4. The utensil of claim 3, wherein the first projecting portion comprises a concave portion facing the first end, and the second projecting portion comprises a concave portion facing the second end.

5. A utensil to open a shell of shellfish, comprising:
a first end, comprising:
　a first member extending from the handle, the first member comprising a wedged tip, and
　a second member extending from the handle and disposed adjacent to the first member, such that at least a portion of the second member contacts the first member, and such that the first member is longer than the second member;
a second end comprising fork; and
a handle to connect the first end to the second end, such that at least a portion of a bottom surface of the handle comprises a sharpened edge.

6. The utensil of claim 5, wherein the fork comprises at least two tines.

7. The utensil of claim 5, wherein at least a portion of the second member is separated from the first member.

8. The utensil of claim 5, wherein the second member comprises:
an inner surface comprising a tapered edge; and
a pointed tip.

9. The utensil of claim 5, further comprising:
a first projecting portion disposed on at least a portion of the bottom surface near the first end; and
a second projecting portion disposed on at least a portion of a top surface of the handle near the first end.

10. The utensil of claim 9, wherein the second projecting portion is disposed further from the second end than the first projecting portion.

11. The utensil of claim 10, wherein the first projecting portion comprises a concave portion facing the first end, and the second projecting portion comprises a concave portion facing the second end.

12. The utensil of claim 1, wherein at least a portion of a bottom surface of the handle comprises a sharpened edge.

* * * * *